United States Patent
Li et al.

(10) Patent No.: US 9,484,802 B2
(45) Date of Patent: Nov. 1, 2016

(54) SOFT-OFF CONTROL CIRCUIT, POWER CONVERTER AND ASSOCIATED CONTROL METHOD

(71) Applicant: Chengdu Monolithic Power Systems Co., Ltd., Chengdu (CN)

(72) Inventors: Yike Li, Chengdu (CN); Xiangyi Yang, Chengdu (CN)

(*) Notice: Subject to any disclaimer, the term of this patent is extended or adjusted under 35 U.S.C. 154(b) by 0 days.

(21) Appl. No.: 14/788,701

(22) Filed: Jun. 30, 2015

(65) Prior Publication Data

US 2015/0381032 A1   Dec. 31, 2015

(30) Foreign Application Priority Data

Jun. 30, 2014 (CN) .......................... 2014 1 0305115

(51) Int. Cl.
| | |
|---|---|
| H02M 1/36 | (2007.01) |
| H02M 3/158 | (2006.01) |
| H02M 3/156 | (2006.01) |
| H02M 1/00 | (2006.01) |

(52) U.S. Cl.
CPC ............ H02M 1/36 (2013.01); H02M 3/156 (2013.01); *H02M 2001/0025* (2013.01)

(58) Field of Classification Search
CPC ................. H02M 1/36; H02M 3/156; H02M 2001/0025
See application file for complete search history.

(56) References Cited

U.S. PATENT DOCUMENTS

| 6,091,610 A * | 7/2000 | Garcia | H02M 1/36 363/17 |
|---|---|---|---|
| 2005/0184713 A1* | 8/2005 | Xu | H02M 3/156 323/282 |
| 2005/0270004 A1* | 12/2005 | Prexl | H02M 3/1588 323/282 |
| 2013/0127429 A1* | 5/2013 | Li | H02M 1/36 323/282 |
| 2014/0152287 A1* | 6/2014 | Weng | H02M 1/36 323/311 |
| 2014/0253072 A1* | 9/2014 | Hussien | H02M 1/36 323/281 |

* cited by examiner

*Primary Examiner* — Jue Zhang

(57) ABSTRACT

A power converter having a soft-off control circuit and a variable reference signal generation module and associated method for controlling the power converter. The variable reference signal generation module is configured to provide a variable reference signal to the power converter. The soft-off control circuit is configured to determine whether an input voltage of the power converter exceeds an over-voltage threshold, and to control the variable reference signal to increase once the input voltage reaches the over-voltage threshold and to decrease when the input voltage is lower than the over-voltage threshold. The power converter can regulate an output voltage to increase with the increase of the variable reference signal and to decrease with the decrease of the variable reference signal so that during a soft-off procedure the input voltage may not exceed the over-voltage threshold, enabling the power converter to be safely shut off.

18 Claims, 6 Drawing Sheets

SOFT-OFF CONTROL CIRCUIT, POWER CONVERTER AND ASSOCIATED CONTROL METHOD

CROSS-REFERENCE TO RELATED APPLICATION(S)

This application claims the benefit of CN Application No. 201410305115.1 filed on Jun. 30, 2014 and incorporated herein by reference.

TECHNICAL FIELD

This disclosure relates generally to power converters, and more particularly but not exclusively relates to switching power converters and soft off control of switching power converters.

BACKGROUND

Power converters such as switch-mode voltage regulators are widely used in various electronic devices for sourcing power to the electronic devices from a power source.

Normally, a switching power converter may comprise a control circuit for controlling a switch module to switch on and off so as to convert an input voltage into an appropriate output voltage. When a power converter is switched off, an off process is needed so that the output voltage can be regulated to gradually decrease from a normal operating steady state value to a ground potential through controlling the on and off switching of its switch module. For example, for a buck type switching converter, its switch module typically comprises a high side switch and a low side switch connected in series between an input voltage and the ground potential. The control circuit of the buck type switching converter generally comprises a zero-crossing detection circuit which is used to prevent a low side switching current flowing through the low side switch from falling negative during normal operation. When the buck type switching converter is switched off, the zero-crossing detection circuit should be disabled to permit the low side switching current to be negative during the off process. However, should the buck type switching converter is switched off when it is operating in no load condition, once the low side switching current falls to negative during the off process, the buck type switching converter turns to a boost type switching converter. This is because the negative low side switching current will charge an input capacitor of the buck type switching converter connected to an input terminal of the converter. If the converter has a large output capacitor, such as an output capacitor of 1000 µF, in comparison of a relatively small input capacitor, such as of 20 µF, the input capacitor will be charged cycle by cycle, resulting in the input voltage increasing. In such circumstance, the input voltage may be increased until it exceeds an allowable safe operating voltage and damages the converter, leading to failure in switching off the buck type switching converter.

SUMMARY

In resolving the above and other problems, there has been provided, in accordance with an embodiment of the present disclosure, a soft-off control circuit for a power converter. The power converter comprises a main switch and is configured to convert an input voltage to an output voltage based on driving the main switch to switch on and off. The power converter may enter a soft-off procedure when it is shut off. The soft-off control circuit is provided to control the soft-off procedure through controlling a variable reference signal. The soft-off control circuit may have a first input terminal configured to receive the input voltage of the power converter, a second input terminal configured to receive an enable signal, a third input terminal configured to receive an over-voltage threshold and an output terminal configured to provide a soft-off control signal. The enable signal may have a first enable state for controlling the power converter to shut off and start the soft-off procedure and a second enable state for controlling the power converter to power on. The over-voltage threshold is designed to indicate an over-voltage of the input voltage during the soft-off procedure. The soft-off control circuit is configured to generate the soft-off control signal at least based on the enable signal, the input voltage and the over-voltage threshold. When the enable signal is at the first enable state, the soft-off control signal is configured to control the variable reference signal to increase when the input voltage is higher than the over-voltage threshold, and to control the variable reference signal to decrease when the input voltage is lower than the over-voltage threshold.

There has also been provided, in accordance with an embodiment of the present disclosure, a variable reference signal generation module comprising the soft-off control circuit. The variable reference signal generation module is configured to provide the variable reference signal.

There has also been provided, in accordance with an embodiment of the present disclosure, a power converter having a normal operation and a soft-off procedure. The power converter may have an input port configured to receive an input voltage and an output port configured to provide an output voltage. The power converter comprises: a switch module at least comprising a main switch configured to switch on and off based on a driving signal to convert the input voltage to the output voltage; a control module having a first control input terminal, a second control input terminal, a third control input terminal and a control output terminal, wherein the first control input terminal is configured to receive a feedback signal indicative of the output voltage, and wherein the second control input terminal is configured to receive a constant reference signal indicative of a desired value of the output voltage, and wherein the third control input terminal is configured to receive a variable reference signal, and wherein the control module is configured to provide the driving signal at least based on processing the feedback signal and the constant reference signal during the normal operation, and wherein the control module is further configured to provide the driving signal at least based on processing the feedback signal and the variable reference signal during the soft-off procedure; and a variable reference signal generation module configured to provide a variable reference signal to the power converter. The variable reference signal generation module comprises the soft-off control circuit which is configured to control the variable reference signal during the soft-off procedure.

There has also been provided, in accordance with an embodiment of the present disclosure, a method for controlling a power converter, wherein the power converter comprises at least a main switch and is configured to convert an input voltage to an output voltage based on driving the main switch to switch on and off, and wherein the power converter has a soft-off procedure. The method for controlling the power converter comprises: sensing the output voltage to provide a feedback signal indicative of the output voltage; generating a variable reference signal; sensing the input voltage during the soft-off procedure and comparing the input voltage with an over-voltage threshold to provide a soft-off control signal; applying the soft-off control signal to control the variable reference signal to increase when the input voltage is higher than the over-voltage threshold; applying the soft-off control signal to control the variable reference signal to decrease when the input voltage is lower than the over-voltage threshold during the soft-off procedure; and regulating the output voltage based on the variable reference signal and the feedback signal during the soft-off procedure, so as to control the output voltage to decrease with the decrease of the variable reference signal and increase with the increase of the variable reference signal.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

DETAILED DESCRIPTION

Various embodiments of the present invention will now be described. In the following description, some specific details, such as example circuits and example values for these circuit components, are included to provide a thorough understanding of embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
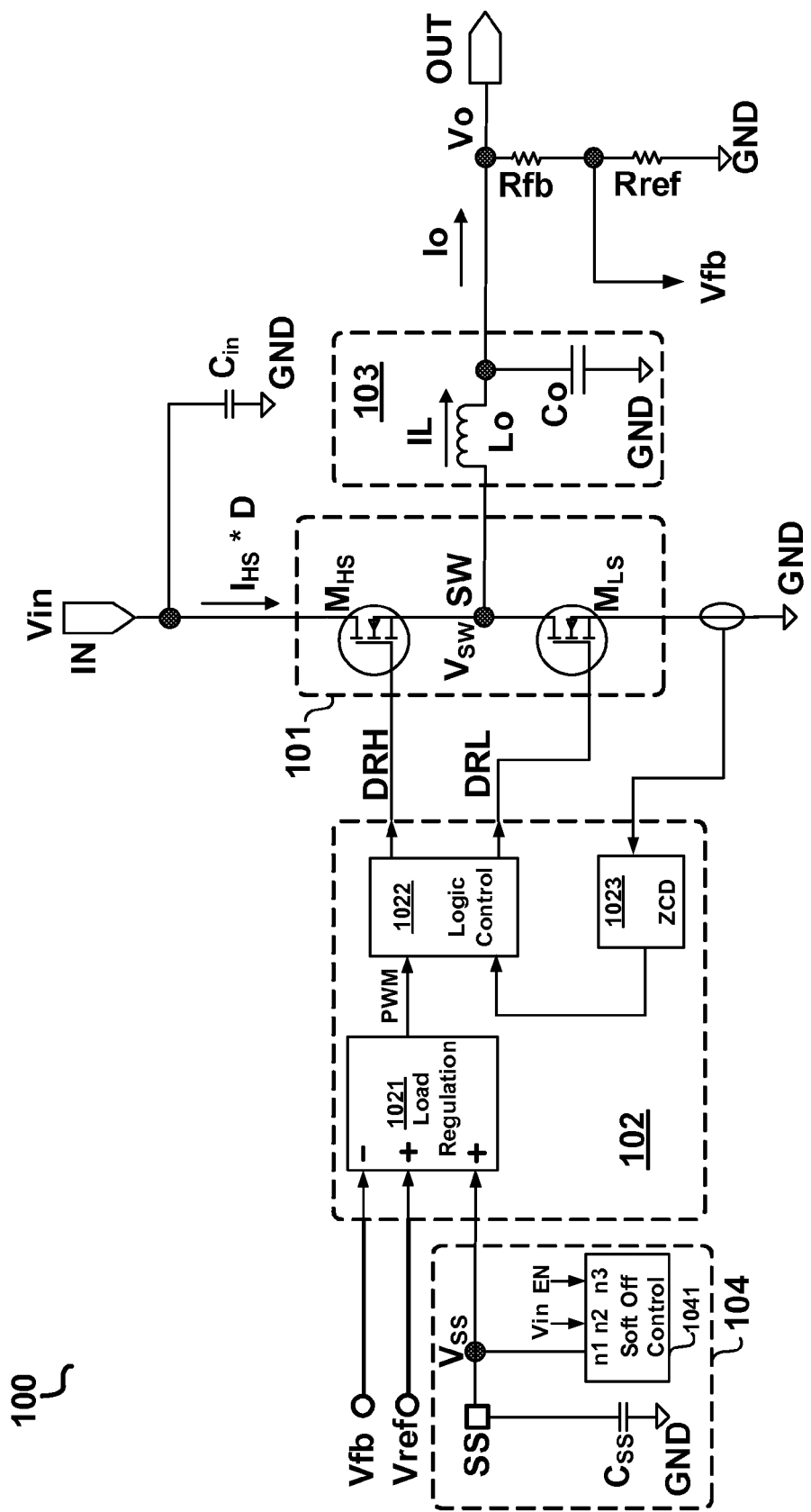
FIG. 1 illustrates a schematic diagram of a power converter 100 in accordance with an exemplary embodiment of the present invention.

FIG. 1 illustrates a schematic diagram of a power converter 100 in accordance with an exemplary embodiment of the present invention. The power converter 100 may comprise an input port IN configured to receive an input voltage Vin; an output port OUT configured to provide an output voltage Vo and an output current Io for supplying a load. The power converter 100 further comprises a switch module 101 at least comprising a main switch (e.g. the switch $M_{HS}$ illustrated in FIG. 1). The switch module 101 may have a first terminal coupled to the input port IN, a second terminal coupled to the output port OUT, and a control terminal configured to receive a driving signal, the switch module 101 is configured to switch on and off based on the driving signal to converter the input voltage Vin into the output voltage Vo. In the example of FIG. 1, the control terminal is illustrated as to comprise a first control terminal configured to receive a first driving signal DRH and a second control terminal configured to receive a second driving signal DRL, the switch module 101 conduct on and off switching based on the first driving signal DRH and the second driving signal DRL. The power converter 100 further comprises a control module 102 having a first control input terminal (e.g. the "−" input terminal illustrated in FIG. 1), a second control input terminal (e.g. the first "+" input terminal illustrated in FIG. 1) and a control output terminal, wherein the first control input terminal is configured to detect/receive a feedback signal Vfb indicative of the output voltage Vo, and the second control input terminal is configured to receive a constant reference signal Vref indicative of a desired value of the output voltage Vo. The control module 102 is configured to provide the driving signal to the switch module 101 at least based on the feedback signal Vfb and the constant reference signal Vref. In accordance with an embodiment, the switch module 101 of the power converter 100 may further comprise a second switch $M_{LS}$. In the example of FIG. 1, the main switch $M_{HS}$ and the second switch $M_{LS}$ are coupled in series between the input port IN and a reference ground GND, wherein the main switch $M_{HS}$ and the second switch $M_{LS}$ have a common connection SW referred to in the following as a switching output terminal SW, providing a switching voltage $V_{SW}$. The main switch $M_{HS}$ may comprise a controllable switching element, e.g. a MOSFET as illustrated in FIG. 1. The second switch $M_{LS}$ may also comprise a controllable switching element, e.g. a MOSFET as illustrated in FIG. 1. In this case, the control output terminal of the control module 102 may comprise a first control output terminal and a second control output terminal configure to respectively provide the first driving signal DRH and the second driving DRL. The first driving signal DRH and the second driving signal DRL may be logically complementary, and may be configured to respectively drive the main switch $M_{HS}$ and the second switch $M_{LS}$ so that the main switch $M_{HS}$ and the second switch $M_{LS}$ are switched on and off complementarily, i.e. when the main switch $M_{HS}$ is switched on, the second switch $M_{LS}$ is switched off and vice versa.

In accordance with an exemplary embodiment of the present invention, the power converter 100 may further comprise a power storage and filtering module 103 which is configured to be electrically coupled to the input port IN when the main switch $M_{HS}$ of the switch module 101 is switched on, and is further configured to be electrically coupled to the output port OUT when the main switch $M_{HS}$ is switched off. In the example of FIG. 1, the power storage and filtering module 103 is illustrated as to comprise an inductive power storage device Lo and a capacitive power storage device Co. The inductive power storage device Lo is at least coupled to the switch module 101. The inductive power storage device Lo is configured to be electrically coupled to the input port IN when the main switch $M_{HS}$ is turned on to store energy, and is further configured to be electrically coupled to the output port OUT when the main switch $M_{HS}$ is turned off to discharge energy. An inductor current IL flows through the inductive power storage device Lo during the storage and discharge of energy. For example, in the embodiment illustrated in FIG. 1, the inductive power storage device Lo has a first terminal coupled to the switch module 101 at the switching output terminal SW and a second terminal coupled to the output port OUT. The capacitive power storage device Co may have a first terminal coupled to the output port OUT and a second terminal connected to the reference ground GND. The capacitive power storage device Co is configured to filter the output voltage Vo or the switching voltage $V_{SW}$. That is to say, the capacitive power storage device Co may help to convert the switching voltage $V_{SW}$ into the smoothed output voltage Vo. In the exemplary embodiment of the present invention of FIG. 1, the power converter 100 is configured to have a buck (step-down) type topology and may be referred to as a buck (step down) switching power converter. In still other embodiments, the power converter 100 may have other converter topologies and may be configured as other types of switching converters, such as boost type, buck-boost type, flyback type etc.

In accordance with an exemplary embodiment of the present invention, the power converter 100 may further comprise a feedback circuit configured to detect the output voltage Vo and provide the feedback signal Vfb is illustrated to comprise a first feedback resistor Rfb and a second feedback resistor Rref connected in series between the output port OUT and the reference ground GND. The feedback signal Vfb is provided from the common connection of the first feedback resistor Rfb and the second feedback resistor Rref. In other embodiments, the feedback module may comprise other circuit elements. In certain embodiment, the power converter 100 may not comprise the feedback module and the output voltage Vo may be provided as the feedback signal Vfb.

Normally, when the power converter 100 is powered on, i.e. when the input voltage Vin is just applied to the input port IN, the output voltage Vo has not yet been established to its desired steady state value. The instantaneous output voltage Vo is quite small, e.g. at the reference ground potential), compared with the desired steady state value of the output voltage. Therefore, the power converter 100 generally has a soft-start procedure, during which the output voltage Vo is regulated to increase gradually from the reference ground potential to its desired steady state value. The soft-start procedure begins at the moment when the switching power converter 100 is powered on and ends when the output voltage Vo arrives at its desired steady state value. Similarly, when the power converter 100 is powered off, i.e. when the input voltage Vin is just disconnected from the input port IN, a soft-off procedure is needed to gradually regulate the output voltage Vo to decrease from the desired steady state value to the reference ground potential. In accordance with an embodiment of the present invention, the soft-start procedure and the soft-off procedure may be controlled through the control module 102. For instance, the control module 102 may further have a third control input terminal (e.g. the second "+" input terminal illustrated in FIG. 1) configured to receive a variable reference signal Vss. The control module 102 may regulate the output voltage Vo during the soft-start procedure and the soft-off procedure based at least on the variable reference signal Vss and the feedback signal Vfb. To provide an example, during the soft-start procedure, the variable reference signal Vss may be configured to gradually increase from the ground potential to a predetermined potential e.g. equal to the constant reference signal Vref after a predetermined start up duration. During the soft-off procedure, the variable reference signal Vss may be configured to gradually decrease from the predetermined potential e.g. equal to the constant reference signal Vref to the ground potential after a predetermined soft-off duration.

In accordance with an embodiment of the present invention, the control module 102 may comprise a load regulation circuit 1021 and a logic control circuit 1022. The load regulation module 1021 may have a first regulation input terminal (e.g. the "−" input terminal of the load regulation module 1021 illustrated in FIG. 1), a second regulation input terminal (e.g. the first "+" input terminal of the load regulation module 1021 illustrated in FIG. 1) and a third regulation input terminal (e.g. the second "+" input terminal of the load regulation module 1021 illustrated in FIG. 1), wherein the first regulation input terminal is configured to receive the feedback signal Vfb, the second regulation input terminal is configured to receive the constant reference signal Vref, and the third regulation input terminal is configured to receive the variable reference signal Vss. The load regulation module 1021 is configured to conduct operation to the feedback signal Vfb and the smaller one of the constant reference signal Vref and the variable reference signal Vss so as to provide a difference signal indicative of a difference between the feedback signal and the smaller one of the constant reference signal Vref and the variable reference signal Vss. The load regulation module 1021 is further configured to provide the pulse width modulation signal PWM at least based on the difference signal. The logic control circuit 1022 may be configured to receive the pulse width modulation signal PWM and a system clock signal CLK, and to generate the first driving signal DRH and the second driving signal DRL based on the pulse width modulation signal PWM and the system clock signal CLK. In accordance with an embodiment of the present invention, the control module 102 may further comprise a zero-cross detection circuit 1023 which is configured to detect a low side switching current $I_{LS}$ flowing through the second switch $M_{LS}$ or the inductor current IL, and to determine whether the low side switching current $I_{LS}$ or the inductor current IL crosses zero from positive to negative. The zero-cross detection circuit 1023 is further configured to provide a zero-cross detection signal $V_{ZCD}$ to the logic control circuit 1022 based on the determination results. Should the zero-cross detection circuit 1023 determine that the low side switching current $I_{LS}$ or the inductor current IL crosses zero from positive to negative, the logic control circuit 1022 turns the second switch $M_{LS}$ off in response to the zero-cross detection signal $V_{ZCD}$, in order to prevent the low side switching current $I_{LS}$ or the inductor current IL falls to negative which is harmful to the power converter 100.

In accordance with an exemplary embodiment of the present invention, the power converter 100 may further comprise a variable reference signal generation module 104 which is configured to generate the variable reference signal Vss. As illustrated in the example of FIG. 1, the variable reference signal generation module 104 may comprise a reference signal generation capacitor Css having a first capacitor terminal electrically coupled to the third input terminal of the control module 102 and a second capacitor terminal connected to the reference ground GND. The reference signal generation capacitor Css may generally not be integrated inside the power converter 100 and thus may be provided by a user, i.e. user programmable. In an exemplary embodiment, the power converter 100 may have a soft-start/soft-off pin SS connected to the third control input terminal of the control module 102. The soft-start/soft-off pin SS is designed to enable a user to couple the reference signal generation capacitor Css to the third control input terminal of the control module 102 through this soft soft-start/soft-off pin SS in practical application, The variable reference signal generation module 104 may further comprise a soft-off control circuit 1041. The soft-off control circuit 1041 may have a first input terminal n2, a second input terminal n3, a third input terminal n4 and an output terminal n1, the first input terminal n2 is configured to receive the input voltage Vin, the second input terminal n3 is configured to receive an enable signal EN, and the third input terminal n4 is configured to receive an over-voltage threshold Vov, The over-voltage threshold Vov is designed to indicate an over-voltage of the input voltage Vin during the soft-off procedure. The soft-off control circuit 1041 is configured to generate a soft-off control signal Soff at the output terminal n1 at least based on the enable signal EN, the input voltage Vin and the over-voltage threshold Vov. The enable signal EN is provided to control the power converter 100 to switch between an operation state and a un-operation state. For instance, the enable signal EN may have a first enable state and a second enable state. The first enable state may be designated for controlling the power converter 100 to switch to the un-operation state, e.g. controlling the power converter 100 to shut off, therefore the first enable state may also be referred to as the off enable state. The second enable state may be designated for controlling the power converter 100 to switch to the operation state, e.g. controlling the power converter 100 to power on and start to operate, therefore the second enable state may also be referred to as the on enable state. In the example illustrated in FIG. 1, the output terminal n1 of the soft-off control circuit 1041 is electrically coupled to the soft-start/soft-off pin SS so that the soft-off control signal Soff is sent to the first capacitor terminal of the reference signal generation capacitor Css to control the charging and discharging of the reference signal generation capacitor Css during the soft-off procedure. When the enable signal EN is at the first enable state (i.e. the off enable state), should the input voltage Vin increase to/higher than the over-voltage threshold Vov, the soft-off control signal Soff is configured to control the reference signal generation capacitor Css to charge. In contrast, should the input voltage Vin decrease to/lower than the over-voltage threshold Vov, the soft-off control signal Soff is configured to control the reference signal generation capacitor Css to discharge.

Now the soft-off procedure of the buck switching power converter 100 will be described in more detail with reference to FIG. 1. If the buck switching power converter 100 is shut down according to practical application requirement, the enable signal EN changes to the first enable state (i.e. the off enable state) and enables the soft-off control circuit 1041 to control the soft-off procedure of the power converter 100. At the very beginning of the soft-off procedure, the input voltage Vin is lower than the over-voltage threshold Vov, thus the soft-off control signal Soff provided by the soft-off control circuit 1041 controls the reference signal generation capacitor Css to discharge so as to make the variable reference signal Vss to decrease gradually. In meanwhile, the control module 102 is configured to control the on and off switching of the switch module 101 based on the feedback signal Vfb and the variable reference signal Vss so as to regulate the output voltage Vo to decrease gradually. During the soft-off procedure, since the zero-cross detection circuit 1023 in the control module 102 is generally disabled, the low side switching current $I_{LS}$ flowing through the second switch $M_{LS}$ is allowed to fall negative (not exceeding a negative current threshold for safety). However, should the buck switching power converter 100 is shut down when it was operating in no load condition, once the low side switching current $I_{LS}$ falls to negative during the off procedure, the buck switching power converter may turn into a boost switching power converter. This is because the negative low side switching current $I_{LS}$ will charge an input capacitor Cin connected to the input port IN of the buck switching power converter 100. If the output capacitor Co is relatively large, such as of 1000 μF, in comparison with the input capacitor Cin, such as of 20 μF, the input capacitor Cin will be charged cycle by cycle, resulting in the input voltage Vin increasing. With the soft-off control circuit 1041, when the input voltage Vin reaches/exceeds the over-voltage threshold Vov, the soft-off control signal Soff generated from the soft-off control circuit 1041 will control the reference signal generation capacitor Css to charge so as to make the variable reference signal Vss to gradually increase. In response to the increased variable reference signal Vss, the control module 102 will be able to regulate the low side switching current $I_{LS}$ (or the inductor current IL) to recover from negative to positive. In consequence, the power converter 100 will be able to change back to a buck switching power converter. After the power converter 100 changes back to buck type, the power converter 100 operates in buck mode, transmitting energy from the input port IN to the output port OUT, making the input voltage Vin to decrease. When the input voltage Vin is decreased to be lower than the over-voltage threshold Vov, the soft-off control signal Soff provided by the soft-off control circuit 1041 will control the reference signal generation capacitor Css to continue the discharging it should perform during the soft-off procedure, making the variable reference signal Vss to continue decreasing so that the control module 102 may be able to regulate the output voltage Vo to continue decreasing. As a result, during the entire soft-off procedure, the soft-off control circuit 1041 will control the reference signal generation capacitor Css to repeat the charging (once the input voltage Vin reaches/exceeds the over-voltage threshold Vov) and the discharging (once the input voltage Vin falls back to be lower than the over-voltage threshold Vov) according to the comparison results of the input voltage Vin with the over-voltage threshold Vov until the variable reference signal Vss is finally decreased to the ground potential and the soft-off procedure is completed. In view of the operation principles described above, one of ordinary skilled in the art would understand that the soft-off control circuit 1041 provided in accordance with various embodiments of the present invention may be able to regulate the input voltage Vin not to exceed the over-voltage threshold Vov during the soft-off procedure, protecting the power converter 100 from being damaged and thus enabling the power converter 100 to be safely and gradually shut off.

Figure 2:
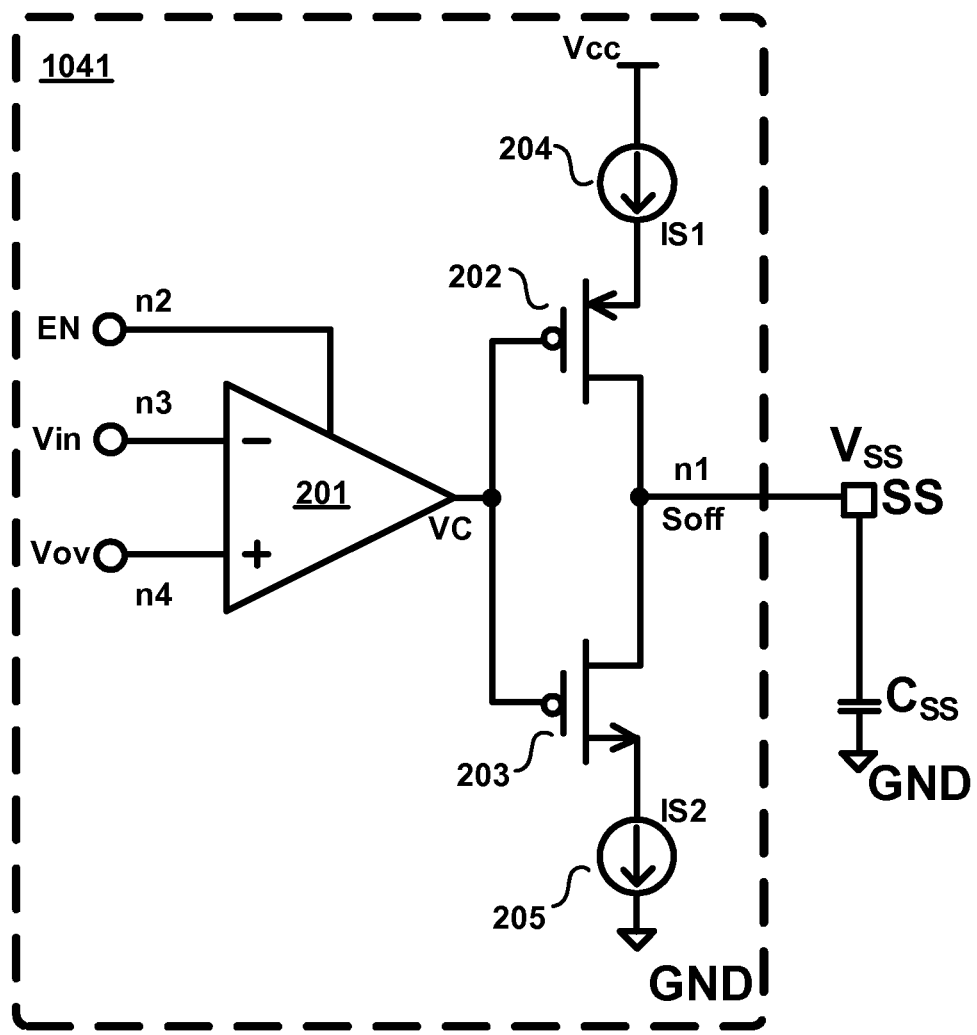
FIG. 2 illustrates a schematic diagram of a soft-off control circuit 1041 that may be used in the power converter 100 of FIG. 1 in accordance with an exemplary embodiment of the present invention.

FIG. 2 illustrates a schematic diagram of a soft-off control circuit 1041 that may be used for controlling the power converter 100 of FIG. 1 in accordance with an exemplary embodiment of the present invention. The soft-off control circuit 1041 may comprise a comparison circuit 201, a first switch element 202, a second switch element 203, a first current source 204 and a second current source 205. The comparison circuit 201 may have a first comparison input terminal (e.g. the "−" input terminal of 201), a second comparison input terminal (e.g. the "+" input terminal of 201) and a comparison output terminal, wherein the first comparison input terminal may be configured to receive the input voltage Vin, the second comparison input terminal may be configured to receive the over-voltage threshold Vov, and the comparison circuit 201 may be configured to compare the input voltage Vin with the over-voltage threshold Vov so as to provide a comparison output signal VC at the comparison output terminal. The first switch element 202 may have a first switch control terminal, a first switch terminal and a second switch terminal, wherein the first switch control terminal is configured to receive the comparison output signal VC, the first switch terminal is electrically coupled to a second terminal of the first current source 204 to receive a first current IS1, and the second switch terminal is electrically coupled to the output terminal n1 of the soft-off control circuit 1041. A first terminal of the first current source 204 is electrically coupled to a supply voltage Vcc which may be the input voltage Vin or an appropriate regulated voltage inside the power converter 100. The second switch element 203 may have a second switch control terminal, a third switch terminal and a fourth switch terminal, wherein the second switch control terminal is configured to receive the comparison output signal VC, the third switch terminal is electrically coupled to a first terminal of the second current source 205, and the fourth switch terminal is electrically coupled to the output terminal n1 of the soft-off control circuit 1041. A second terminal of the second current source 205 is connected to ground GND. When the input voltage Vin is lower than the over-voltage threshold Vov, the comparison output signal VC may have a first logic state (e.g. logic high) which drives the first switch element 202 to switch off and the second switch element 203 to switch on. In this circumstance, the second current source 205 is electrically coupled to the output terminal n1 and thus a second current IS2 flowing through the second current source 205 is provided as the soft-off control signal Soff to discharge the reference signal generation capacitor Css. When the input voltage Vin is higher than the over-voltage threshold Vov, the comparison output signal VC may have a second logic state (e.g. logic low) which drives the first switch element 202 to switch on and the second switch element 203 to switch off. In this circumstance, the first current source 204 is electrically coupled to the output terminal n1 and thus a first current IS1 flowing through the first current source 204 is provided as the soft-off control signal Soff to charge the reference signal generation capacitor Css.

Figure 3:
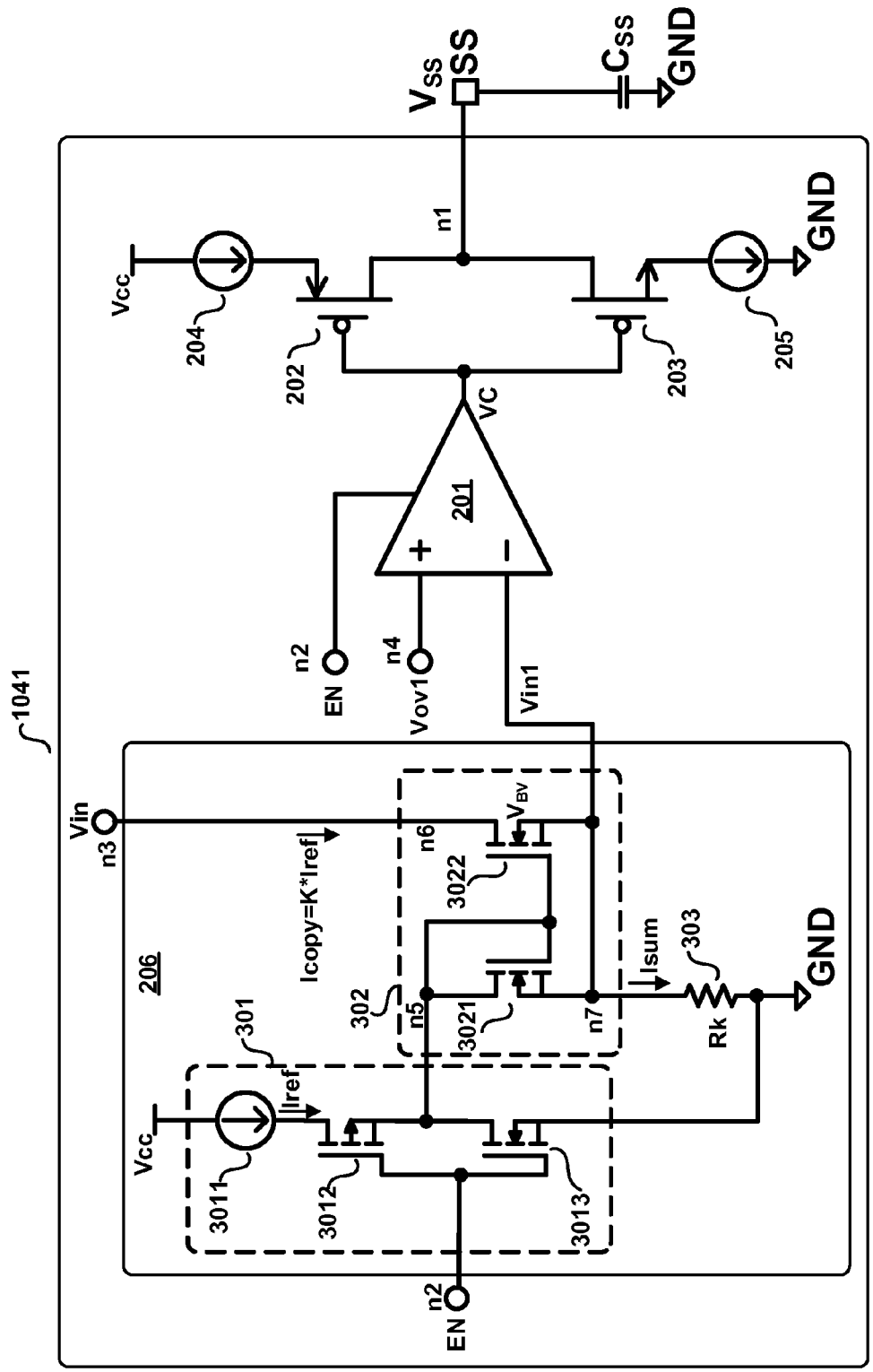
FIG. 3 illustrates a schematic diagram of a soft-off control circuit 1041 that may be used in the power converter 100 of FIG. 1 in accordance with an alternative embodiment of the present invention.

FIG. 3 illustrates a schematic diagram of a soft-off control circuit 1041 that may be used for controlling the power converter 100 of FIG. 1 in accordance with an alternative embodiment of the present invention. The use of the same reference labels in FIG. 3 indicates the same or like components or structures with substantially the same functions as in FIG. 2 for the sake of simplicity. The over-voltage threshold Vov provided in the embodiment illustrated in FIG. 2 may have a substantially constant value e.g. provided by an internal reference signal generation circuit. However, with the variation in fabrication process and operating temperature etc., the maximum voltage that the power converter 100 can afford may change accordingly. Thus, the over-voltage threshold Vov should be set conservatively, for instance, to a value smaller than the minimum one of the affordable maximum voltages under various fabrication processes and operating temperatures etc. According to the embodiment of FIG. 3, the soft-off control circuit 1041 may further comprise an offset correction circuit 206. The input voltage Vin is coupled to the first comparison input terminal (e.g. the "−" input terminal in FIG. 3) of the comparison circuit 201 through the offset correction circuit 206. The offset correction circuit 206 may help to regulate the over-voltage threshold Vov so as to correct an offset in determining whether the input voltage Vin is over-voltage due to variations in fabrication process, operating temperature etc. In this way, the elements that receiving the input voltage Vin such as the main switch $M_{HS}$ may have their high-voltage resistance capability fully performed despite of variations in fabrication process and operating temperature etc.

As illustrated in the example of FIG. 3, the offset correction circuit 206 may comprise a controllable current source 301, a current mirror 302 and a current to voltage conversion circuit 303. The controllable current source 301 may have an enable input terminal (also labeled with n2) configured to receive the enable signal EN, a first terminal (also labeled with Vcc) configured to receive the supply voltage Vcc, a second terminal connected to ground and an output terminal (labeled with n5) configured to transmit a reference current Iref in response to the enable signal EN. In an embodiment, the controllable current source 301 is configured to output the reference current Iref at the output terminal n5 when the enable signal EN is at the first enable state (i.e. the off enable state), and is further configured to cut the reference current Iref off from the output terminal n5 when the enable signal EN is at the second enable state (i.e. the on enable state). In accordance with an exemplary embodiment, the controllable current source 301 may comprise a reference current source 3011, a third switch element 3012 and a fourth switch element 3013. The reference current source 3011 may have a first terminal coupled to the supply voltage Vcc and a second terminal configured to provide the reference current Iref. The third switch element 3012 may have a third switch control terminal configured to receive the enable signal EN, a fifth switch terminal coupled to the second terminal of the reference current source 3011 to receive the reference current Iref, and a sixth switch terminal coupled to the output terminal (n5) of the controllable current source 301. The fourth switch element 3013 may have a fourth switch control terminal configured to receive the enable signal EN, a seventh switch terminal coupled to the output terminal (n5) of the controllable current source 301, and an eighth switch terminal connected to the reference ground GND. With this configuration, when the enable signal EN is at the first enable state (the off enable state), the third switch element 3012 is turned on and the fourth switch element 3013 is switched off, so that the reference current Iref is transmitted to the output terminal (n5) of the controllable current source 301 through the third switch element 3012. When the enable signal EN is at the second enable state (the on enable state), the fourth switch element 3012 is turned off and the fourth switch element is turned on, so that the reference current Iref is cut off from the output terminal (n5) of the controllable current source 301.

Still referring to FIG. 3, the current mirror 302 may have a mirror input terminal (also labeled with n5), a mirror output terminal n6 and a current summing terminal n7. The mirror input terminal (n5) is coupled to the output terminal (n5) of the controllable current source 301 so as to receive the reference current Iref when the enable signal EN is at the first enable state. The mirror output terminal n6 is configured to mirror the reference current Iref and apply a mirror factor K (K>0) to provide a mirrored current Icopy, i.e. Icopy=K*Iref. The mirror output terminal n6 is further configured to be coupled to the second input terminal n3 of the soft-off control circuit 1041 to receive the input voltage Vin. The current summing terminal n7 is configured to provide a summing current Isum which is a sum of the reference current Iref flowing through the mirror input terminal (n5) and the mirrored current Icopy flowing through the mirror output terminal n6. In the exemplary embodiment illustrated in FIG. 3, the current mirror 302 may comprise a first high-voltage transistor, e.g. a first double diffusion metal oxide semiconductor field effect transistor (DMOS) 3021, and a second transistor, e.g. a second DMOS 3022. Both the first DMOS 3021 and the second DMOS 3022 have a drain, a gate and a source, wherein the drain and the gate of the first DMOS 3021 are coupled together and form the mirror input terminal n5, the drain of the second DMOS 3022 functions as the mirror output terminal n6, the gate of the second DMOS 3022 is coupled to the gate of the first DMOS 3021, and the source of the first DMOS 3021 and the source of the second DMOS 3022 are coupled together to form the current summing terminal n7. In such an example, the first DMOS 3021 may have a first channel having a first channel width W1 and a first channel length L1 determining a first ratio, and the second DMOS 3022 may a second channel having a second channel width W2 and a second channel length L2 determining a second ratio. The first ratio is determined as the ratio of the first channel width W1 to the first channel length L1, which can be expressed as W1/L1. Similarly, the second ratio is determined as the ratio of the second channel width W2 to the second channel length L2, which can be expressed as W2/L2. The mirror factor K may be set by adjusting a ratio of the second ratio to the first ratio. That is to say, the mirror factor K may be adjusted by adjusting a value of the expression of (W2/L2)/(W1/L1).

Still referring to FIG. 3, the current to voltage conversion circuit 303 is coupled between the current summing terminal n7 and the reference ground GND and is configured to convert the summing current Isum to a voltage signal Vin1 with a conversion factor of Rk. In FIG. 3, the current to voltage conversion circuit 303 is illustrated as to comprise a conversion resistor Rk. One of ordinary skilled in the art would understand that the current to voltage conversion circuit 303 is not confined to a resistor but may comprise any other suitable elements/circuits for converting a current to a voltage.

In the embodiment illustrated in FIG. 3, the first comparison input terminal (e.g. the "−" input terminal) of the comparison circuit 201 is configured to receive the voltage signal Vin1, and the second comparison input terminal (e.g. the "+" input terminal) of the comparison circuit 201 is configured to receive a second over-voltage threshold Vov1. The comparison circuit 201 is configured to compare the voltage signal Vin1 with the second over-voltage threshold Vov1 so as to provide the comparison output signal VC. The second over-voltage threshold Vov1 may have a predetermined threshold value which may be set to be equal to an instantaneous value of the voltage signal Vin1 when the input voltage Vin is just increased to be higher than the over-voltage threshold Vov.

In the following, operating principles of the soft-off control circuit 1041 shown in FIG. 3 will be described in conjunction with FIG. 2. During normal operation of the soft-off procedure of the power converter 100, the enable signal EN has the first enable state (off enable state). Accordingly, the controllable current source 301 is enabled to output the reference current Iref to the mirror input terminal n5 of the current mirror 302. Then the mirror output terminal n6 provides the mirrored current Icopy and the current summing terminal provides the sum of the reference current Iref and the mirrored current Icopy as the summing current Isum, i.e. Isum=Iref+Icopy=(1+K)*Iref. In this circumstance, the current to voltage conversion circuit 303 converts the summing current Isum to the voltage signal Vin1 and the voltage signal Vin1 may have a substantially constant value, which may be expressed as Vin1=Isum+Rk=(1+K)*Rk*Iref. Thus, the voltage signal Vin1 may be regulated through appropriately setting the reference current Iref, the mirror factor K and the conversion factor Rk, so that the voltage signal Vin1 is set to be lower than the second over-voltage threshold Vov1 during normal operation of the soft-off procedure. In this way, the comparison output signal VC has the first logic state (e.g. logic high) and drives the first switch element 202 off and the second switch element 203 on. Thus, the second current IS2 flowing through the second current source 205 is provided as the soft-off control signal Soff to discharge the reference signal generation capacitor Css.

However, during the soft-off procedure, once the low side switching current $I_{LS}$ decreases to be negative and charges the input voltage Vin to be higher than the over-voltage threshold Vov, the current output at the mirror output terminal n6 of the current mirror 302 will increase immediately resulting in the summing current Isum increased instantaneously. This increased summing current Isum leads to the converted voltage signal Vin1 exceeding the second over-voltage threshold Vov1, and thus the comparison output signal VC changes to the second logic state (e.g. logic low), which drives the first switch element 202 on and the second switch element 203 off. Consequently, the first current IS1 provided by the first current source 204 is provided as the soft-off control signal Soff to charge the reference signal generation capacitor Css. In the example of FIG. 3, a breakdown voltage $V_{BV}$ of the second DMOS 3022 may function as the over-voltage threshold Vov. When the input voltage Vin exceeds the breakdown voltage $V_{BV}$, the current flowing through the second DMOS 3022, i.e. the current output at the mirror output terminal n6 will increase immediately, resulting in the voltage signal Vin1 exceeding the second over-voltage threshold Vov1. In response, the first current IS1 is provided as the soft-off control signal Soff to charge the reference signal generation capacitor Css until the low side switching current $I_{LS}$ is increased from negative to positive, making the input voltage Vin to decrease. When the input voltage Vin is decreased to be lower than the breakdown voltage $V_{BV}$, the current mirror 302 returns to normal operation and the voltage signal Vin1 is decreased to be lower than the second threshold Vov1, Consequently, the second current IS2 is provided as the soft-off signal Soff to discharge the reference signal generation capacitor Css, making the variable reference signal Vss to continue decreasing. During the entire soft-off procedure, the soft-off control circuit 1041 will control the reference signal generation capacitor Css to repeat the charging (once the input voltage Vin reaches/exceeds the over-voltage threshold Vov) and the discharging (once the input voltage Vin falls back to be lower than the over-voltage threshold Vov) until the variable reference signal Vss is finally decreased to the ground potential and the soft-off procedure is completed.

In the embodiment described with reference to the illustration of FIG. 3, setting the breakdown voltage $V_{BV}$ of the second DMOS 3022 as the over-voltage threshold Vov to determine whether the input voltage Vin is under an over-voltage condition has several benefits. Since the breakdown voltage $V_{BV}$ can track the variations in fabrication process and operating temperature etc., it may ensure the power converter 100 to operate in a safe range despite of the changes in fabrication process and operating temperature etc. Thus, the power converter 100 and the elements receiving the input voltage Vin, e.g. the main switch $M_{HS}$ may their high-voltage resistance capability fully performed.

Figure 4:
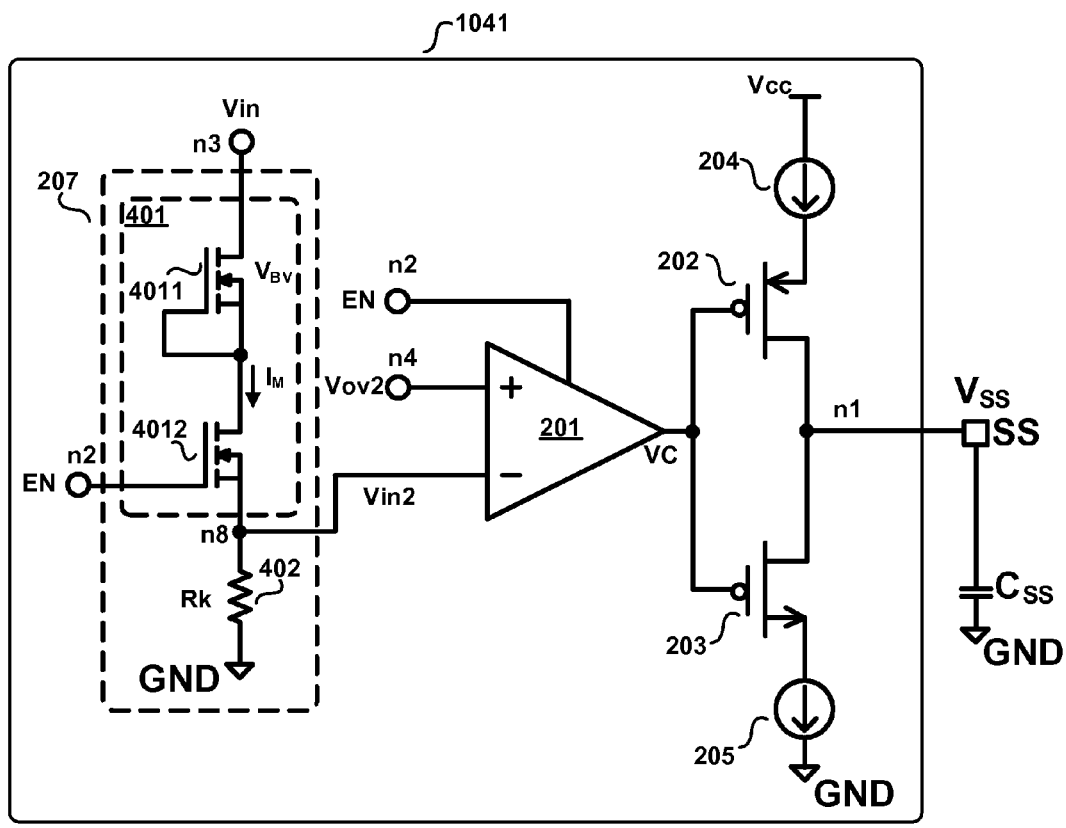
FIG. 4 illustrates a schematic diagram of a soft-off control circuit 1041 that may be used in the power converter 100 of FIG. 1 in accordance with an alternative embodiment of the present invention.

FIG. 4 illustrates a schematic diagram of a soft-off control circuit 1041 that may be used for controlling the power converter 100 of FIG. 1 in accordance with an alternative embodiment of the present invention. The use of the same reference labels in FIG. 4 indicates the same or like components or structures with substantially the same functions as in FIG. 2 for the sake of simplicity. As shown in FIG. 4, the soft-off control circuit 1041 may comprise an offset correction circuit 207. The input voltage Vin is coupled to the first comparison input terminal (e.g. the "−" input terminal in FIG. 4) of the comparison circuit 201 through the offset correction circuit 207. The offset correction circuit 207 may help to regulate the over-voltage threshold Vov so as to correct an offset in determining whether the input voltage Vin is over-voltage due to variations in fabrication process, operating temperature etc. In this way, the elements that receiving the input voltage Vin such as the main switch $M_{HS}$ may have their high-voltage resistance capability fully performed despite of variations in fabrication process and operating temperature etc.

As illustrated in the example of FIG. 3, the offset correction circuit 206 may comprise a controllable current source 401 and a current to voltage conversion circuit 402. The controllable current source 401 may have an enable input terminal (also labeled with n2) configured to receive the enable signal EN, a first terminal (also labeled with Vcc) configured to receive the supply voltage Vcc, and an output terminal (labeled with n8). The controllable current source 401 is configured to output a current $I_M$ at the output terminal n8 when the enable signal EN is at the first enable state (i.e. the off enable state), and is further configured to cut the current $I_M$ off from the output terminal n8 when the enable signal EN is at the second enable state (i.e. the on enable state). In accordance with an exemplary embodiment, the controllable current source 401 may comprise a third high-voltage transistor, e.g. a third DMOS 4011, and a fifth switch element 4012. The third DMOS 4011 has a drain, a gate and a source, wherein the drain is configured to receive the input voltage Vin, the gate is coupled to the source which is configured to provide the current $I_M$. The fifth switch element 4012 may have a fifth switch control terminal, a ninth switch terminal and a tenth switch terminal, wherein the fifth switch control terminal is configured to receive the enable signal EN, the ninth switch terminal is coupled to the source of the third DMOS 4011 to receive the current $I_M$, and the tenth switch terminal is coupled to the output terminal n8 of the controllable current source 401. When the enable signal EN is at the first enable state (the off enable state), the fifth switch element 4012 is turned on so that the current $I_M$ is transmitted to the output terminal n8 of the controllable current source 401 through the fifth switch element 4012. When the enable signal EN is at the second enable state (the on enable state), the fifth switch element 4012 is turned off so that the current $I_M$ is cut off from the output terminal n8 of the controllable current source 401.

The current to voltage conversion circuit 402 is coupled between the output terminal n8 and the reference ground GND and is configured to convert the current $I_M$ to a second voltage signal Vin2 with a conversion factor of Rk. In FIG. 4, the current to voltage conversion circuit 402 is illustrated as to comprise a conversion resistor Rk. One of ordinary skilled in the art would understand that the current to voltage conversion circuit 402 is not confined to a resistor but may comprise any other suitable elements/circuits for converting a current to a voltage.

In the embodiment illustrated in FIG. 3, the first comparison input terminal (e.g. the "−" input terminal) of the comparison circuit 201 is configured to receive the second voltage signal Vin2, and the second comparison input terminal (e.g. the "+" input terminal) of the comparison circuit 201 is configured to receive a third over-voltage threshold Vov2. The comparison circuit 201 is configured to compare the second voltage signal Vin2 with the third over-voltage threshold Vov2 so as to provide the comparison output signal VC. The third over-voltage threshold Vov2 may have a predetermined threshold value which may be set to be equal to an instantaneous value of the second voltage signal Vin2 when the input voltage Vin is just increased to be higher than the over-voltage threshold Vov.

In the following, operating principles of the soft-off control circuit 1041 shown in FIG. 4 will be described in conjunction with FIG. 2. During normal operation of the soft-off procedure of the power converter 100, the enable signal EN has the first enable state (off enable state). Accordingly, the controllable current source 401 is enabled to output the current $I_M$ at the output terminal n8. Then the current to voltage conversion circuit 402 receives the current $I_M$ and converts it to the second voltage signal Vin2. The second voltage signal Vin2 may have a substantially constant value, which may be expressed as Vin2=$I_M$*Rk. Thus, the second voltage signal Vin2 may be regulated through appropriately setting the conversion factor Rk, so that the second voltage signal Vin2 is set to be lower than the third over-voltage threshold Vov2 during normal operation of the soft-off procedure. In this way, the comparison output signal VC has the first logic state (e.g. logic high) and drives the first switch element 202 off and the second switch element 203 on. Thus, the second current IS2 flowing through the second current source 205 is provided as the soft-off control signal Soff to discharge the reference signal generation capacitor Css.

However, during the soft-off procedure, once the low side switching current $I_{LS}$ decreases to be negative and charges the input voltage Vin to be higher than the over-voltage threshold Vov, the current $I_M$ output at the output terminal n8 of the controllable current source 401 will increase immediately resulting in the second voltage signal Vin2 increased instantaneously to be higher than the third over-voltage threshold Vov2, and thus the comparison output signal VC changes to the second logic state (e.g. logic low), which drives the first switch element 202 on and the second switch element 203 off. Consequently, the first current IS1 provided by the first current source 204 is provided as the soft-off control signal Soff to charge the reference signal generation capacitor Css. In the example of FIG. 4, a breakdown voltage $V_{BV}$ of the third DMOS 4011 may function as the over-voltage threshold Vov. When the input voltage Vin exceeds the breakdown voltage $V_{BV}$, the current $I_M$ flowing through the third DMOS 4011, will increase immediately, resulting in the second voltage signal Vin2 exceeding the third over-voltage threshold Vov2. In response, the first current IS1 is provided as the soft-off control signal Soff to charge the reference signal generation capacitor Css until the low side switching current $I_{LS}$ is increased from negative to positive, making the input voltage Vin to decrease. When the input voltage Vin is decreased to be lower than the breakdown voltage $V_{BV}$, the third DMOS 4011 returns to normal operation and the second voltage signal Vin2 is recovered to be lower than the third threshold Vov2, Consequently, the second current IS2 is provided as the soft-off signal Soff to discharge the reference signal generation capacitor Css, making the variable reference signal Vss to continue decreasing. During the entire soft-off procedure, the soft-off control circuit 1041 will control the reference signal generation capacitor Css to repeat the charging (once the input voltage Vin reaches/exceeds the over-voltage threshold Vov) and the discharging (once the input voltage Vin falls back to be lower than the over-voltage threshold Vov) until the variable reference signal Vss is finally decreased to the ground potential and the soft-off procedure is completed.

In the embodiment described with reference to the illustration of FIG. 4, setting the breakdown voltage $V_{BV}$ of the third DMOS 4011 as the over-voltage threshold Vov to determine whether the input voltage Vin is under an over-voltage condition has several benefits. Since the breakdown voltage $V_{BV}$ can track the variations in fabrication process and operating temperature etc., it may ensure the power converter 100 to operate in a safe range despite of the changes in fabrication process and operating temperature etc. Thus, the power converter 100 and the elements receiving the input voltage Vin, e.g. the main switch $M_{HS}$ may their high-voltage resistance capability fully performed.

Figure 5:
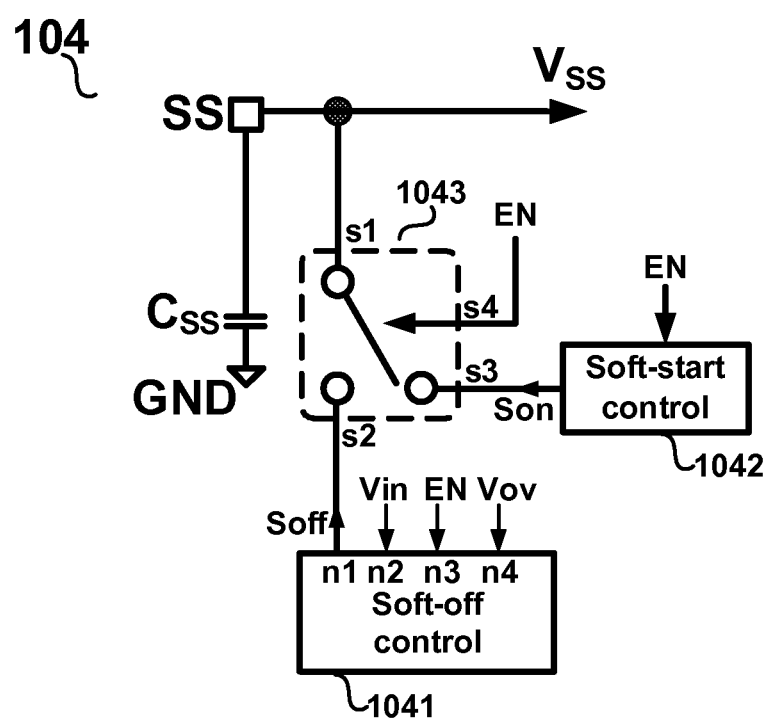
FIG. 5 illustrates a schematic diagram of a variable reference signal generation module 104 that may be used in the power converter 100 of FIG. 1 in accordance with an alternative embodiment of the present invention.

FIG. 5 illustrates a schematic diagram of a variable reference signal generation module 104 that may be used for controlling the power converter 100 of FIG. 1 in accordance with an alternative embodiment of the present invention. The use of the same reference labels in FIG. 5 indicates the same or like components or structures with substantially the same functions as in FIG. 1 for the sake of simplicity. As shown in FIG. 5, the variable reference signal generation module 104 may further comprise a soft-start control circuit 1042 and a selection circuit 1043. The soft-start control circuit 1042 is configured to receive the enable signal EN, and to be disabled when the enable signal EN is at the first enable state (the off enable state) and to be enabled when the enable signal EN is at the second enable state (the on enable state). When the soft-start control circuit 1042 is enabled, it is configured to output a soft-start control signal Son. The soft-start control signal Son is configured to control the soft-start procedure of the power converter 100 through controlling the variable reference signal Vss to increase gradually from the ground potential to reach the constant reference signal Vref in a predetermined soft-start duration. The selection circuit 1043 may have a first transmission terminal s1, a second transmission terminal s2, a third transmission terminal s3 and a transmission control terminal s4. The first transmission terminal s1 is coupled to the soft-start/soft-off pin SS. The second transmission terminal s2 is coupled to the output terminal n1 of the soft-off control circuit 1041 so as to receive the soft-off control signal Soff. The third transmission terminal s3 is coupled to the output terminal of the soft-start control circuit 1042 so as to receive the soft-start control signal Son. The transmission control terminal s4 is configured to receive the enable signal EN. The selection circuit 1043 is configured to couple the first transmission terminal s1 to the second transmission terminal s2 when the enable signal EN is at the first enable state, and to couple the first transmission terminal s1 to the third transmission terminal s3 when the enable signal EN is at the second enable state.

During the soft-start procedure of the power converter 100, the enable signal EN has the second enable state (the on enable state), and thus the soft-start circuit 1042 is enabled while the soft-off control circuit 1041 is disabled. Therefore, the soft-start control circuit 1042 provides the soft-start control signal Son to the third transmission terminal s3 of the selection circuit 1043 and is then transmitted to the first transmission terminal s1. Consequently, the soft-start control signal Son is coupled to the soft-start/soft-off pin SS to charge the reference signal generation capacitor Css. Accordingly, the variable reference signal Vss is increased gradually. The control module 102 then regulates the output voltage Vo to increase gradually based on the increasing variable reference signal Vss and the feedback signal $V_{FB}$ until the variable reference signal Vss is increased to the constant Vref and the soft-start procedure completes.

During the soft-off procedure of the power converter 100, the enable signal EN has the first enable state (the off enable state), and thus the soft-off circuit 1041 is enabled while the soft-start control circuit 1042 is disabled. Therefore, the soft-off control circuit 1041 provides the soft-off control signal Soff to the second transmission terminal s2 of the selection circuit 1043 and is then transmitted to the first transmission terminal s1. Consequently, the soft-off control signal Soff is coupled to the soft-start/soft-off pin SS. In this circumstance, the soft-off control circuit 1041 determines whether the input voltage Vin exceeds the over-voltage threshold Vov (which is an allowable safe operation threshold). If the input voltage Vin is lower than the over-voltage threshold Vov, the soft-off control signal Soff controls the reference signal generation capacitor Css to discharge. Accordingly, the variable reference signal Vss is decreased gradually. However, once the input voltage Vin is increased to be higher than the over-voltage threshold Vov due to the low side switching current $I_{LS}$ becoming negative and charging the input capacitor Cin, the soft-off control signal Soff controls the reference signal generation capacitor Css to charge so as to temporally increase the variable reference signal Vss until the control module 102 regulates the input voltage Vin back to be lower than the over-voltage threshold Vov. In response, the soft-off control signal Soff controls the reference signal generation capacitor Css to continue discharging and making the variable reference signal Vss to continue decreasing. The charging and discharging of the reference signal generation capacitor Css repeats according to whether the input voltage Vin exceeds the over-voltage threshold Vov until the variable reference signal Vss is finally decreased to the ground potential and the control module 102 regulates the output voltage Vo to decrease gradually to the ground potential and the soft-off procedure completes.

In accordance with the embodiment of FIG. 5, the variable reference signal generation module 104 may be able to control both the soft-start procedure and the soft-off procedure of the power converter 100.

The advantages of the various embodiments of the variable reference signal generation module 104, the soft-off control circuit 1041 and the power converter (e.g. the power converter 100) comprising the same of the present invention are not confined to those described above. These and other advantages of the various embodiments of the present invention will become more apparent upon reading the whole detailed descriptions and studying the various figures of the drawings.

Figure 6:
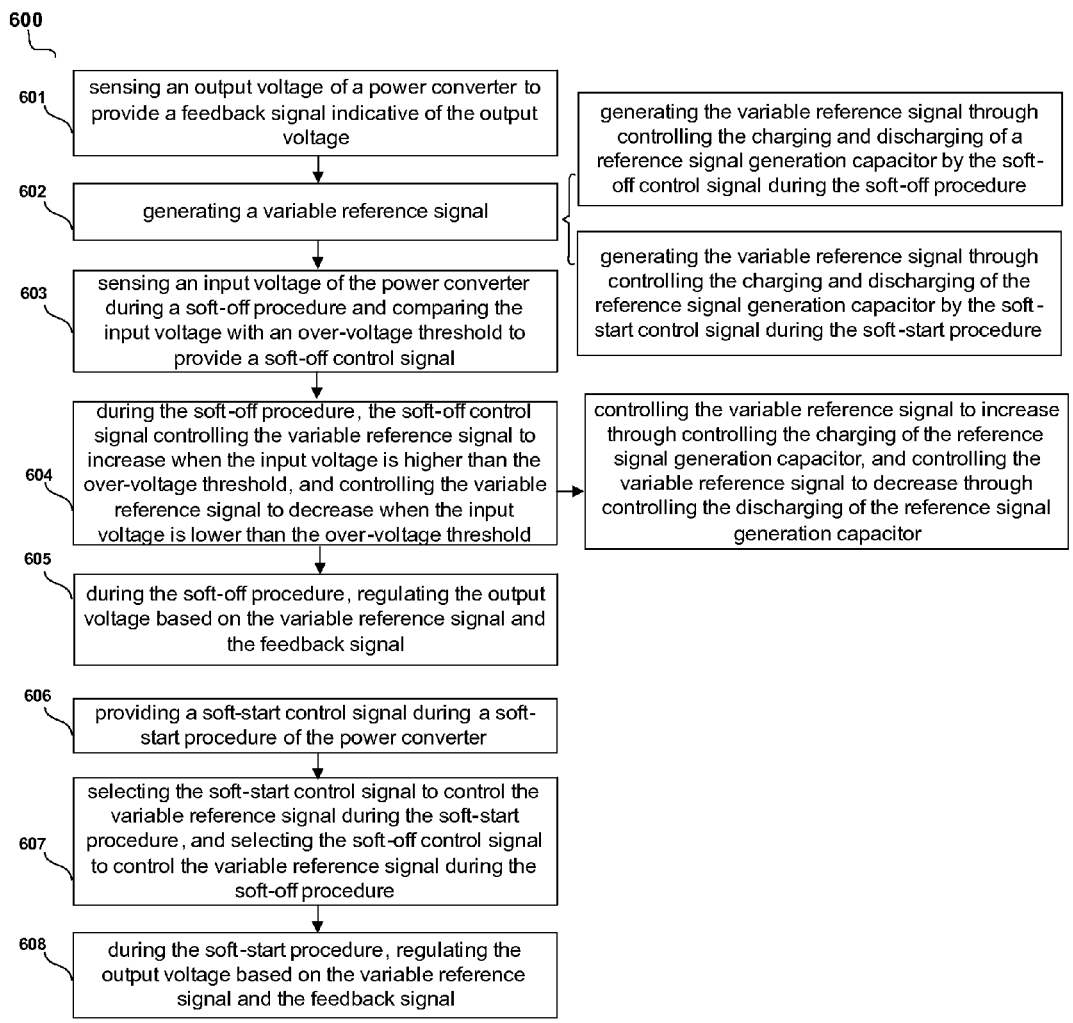
FIG. 6 illustrates a flow diagram of a method for controlling a power converter in accordance with an exemplary embodiment of the present invention.

FIG. 6 illustrates a flow diagram of a method for controlling a power converter in accordance with an exemplary embodiment of the present invention. The power converter (such as the power converter 100) may comprise at least a main switch (e.g. $M_{HS}$ in FIG. 1) and is configured to convert an input voltage (Vin) to an output voltage (Vo) based on driving the main switch to switch on and off. The power converter may have a soft-off procedure. The soft-off procedure begins at the moment when the power converter is powered off and ends when the output voltage is decreased to the ground potential The method for controlling the power converter may comprise: step 601, sensing the output voltage to provide a feedback signal indicative of the output voltage; step 602, generating a variable reference signal; step 603, sensing the input voltage during the soft-off procedure and comparing the input voltage with an over-voltage threshold to provide a soft-off control signal; step 604, during the soft-off procedure, the soft-off control signal controlling the variable reference signal to increase when the input voltage is higher than the over-voltage threshold, and controlling the variable reference signal to decrease when the input voltage is lower than the over-voltage threshold; and step 605, during the soft-off procedure, regulating the output voltage based on the variable reference signal and the feedback signal, so as to control the output voltage to decrease with the decrease of the variable reference signal and increase with the increase of the variable reference signal, and thus controlling the input voltage to increase with the decrease of the variable reference signal.

In accordance with an exemplary embodiment of the present invention, at step 602, generating the variable reference signal may comprise generating the variable reference signal through controlling the charging and discharging of a reference signal generation capacitor (e.g. the capacitor Css in FIGS. 1-5) by the soft-off control signal. Correspondingly, at step 604, the soft-off control signal controlling the variable reference signal to increase through controlling the charging of the reference signal generation capacitor, and controlling the variable reference signal to decrease through controlling the discharging of the reference signal generation capacitor.

In accordance with an exemplary embodiment of the present invention, the method for controlling the power converter may further comprise at step 603, setting the over-voltage threshold to a break down voltage of a high-voltage transistor matching with the main switch so that the over-voltage threshold can track the variations in fabrication process and operating temperature etc.

In accordance with an exemplary embodiment of the present invention, the power converter may further have a soft-start procedure beginning at the moment when the power converter is powered on and ending when the output voltage is increased gradually to a desired steady state value. The method for controlling the power converter may further comprise: step 606, providing a soft-start control signal during the soft-start procedure; step 607, in response to the enable signal, selecting the soft-start control signal to control the variable reference signal during the soft-start procedure, and selecting the soft-off control signal to control the variable reference signal during the soft-off procedure; and step 608, during the soft-start procedure, regulating the output voltage based on the variable reference signal and the feedback signal, so as to control the output voltage to decrease with the decrease of the variable reference signal and increase with the increase of the variable reference signal.

In accordance with an exemplary embodiment of the present invention, at step 602, generating the variable reference signal may further comprise generating the variable reference signal through controlling the charging and discharging of the reference signal generation capacitor (e.g. the capacitor Css in FIGS. 1-5) by the soft-start control signal during the soft-start procedure. Correspondingly, at step 607, the soft-start control signal controlling the variable reference signal to increase through controlling the charging of the reference signal generation capacitor.

Methods and steps of controlling the power converter described above in the various embodiments of the present invention are illustrative and not intended to be limiting. Well known controlling steps, operating processes, and parameters etc. are not described in detail to avoid obscuring aspects of the invention. Those skilled in the art should understand that the steps described in the embodiments with reference to FIG. 6 may be implemented in different orders and are not limited to the embodiments described.

Although a soft-off control circuit, a variable reference signal generation module and a power converter comprising the soft-off control circuit and associated control methods are illustrated and explained based on a buck type power converter according to various embodiments of the present invention, this is not intended to be limiting. Persons of ordinary skill in the art will understand that the circuits, methods and principles taught herein may apply to any other suitable types of power converters.

From the foregoing, it will be appreciated that specific embodiments of the present invention have been described herein for purposes of illustration, but that various modifications may be made without deviating from the spirit and scope of various embodiments of the present invention. Many of the elements of one embodiment may be combined with other embodiments in addition to or in lieu of the elements of the other embodiments. Accordingly, the present invention is not limited except as by the appended claims.

We claim:

1. A soft-off control circuit for controlling a soft-off procedure of a power converter, wherein the power converter comprises a main switch and is configured to receive an input voltage and to provide an output voltage based on driving the main switch to switch on and off, and wherein the power converter further comprises a soft-start/soft-off pin configured to provide a variable reference signal; the soft-off control circuit comprising:

a first input terminal configured to receive the input voltage of the power converter;

a second input terminal configured to receive an enable signal, wherein the enable signal has a first enable state for controlling the power converter to shut off and start the soft-off procedure and a second enable state for controlling the power converter to power on;

a third input terminal configured to receive an over-voltage threshold, wherein the over-voltage threshold is designed to indicate an over-voltage of the input voltage during the soft-off procedure; and an output terminal configured to provide a soft-off control signal; wherein the soft-off control circuit is configured to generate the soft-off control signal at least based on the enable signal, the input voltage and the over-voltage threshold, and wherein when the enable signal is at the first enable state, the soft-off control signal is configured to control the variable reference signal to increase when the input voltage is higher than the over-voltage threshold, and to control the variable reference signal to decrease when the input voltage is lower than the over-voltage threshold.

2. The soft-off control circuit of claim 1, wherein
the soft-star/soft-off pin is coupled to a reference signal generation capacitor; and wherein
the soft-off control signal is coupled to the soft-start/soft-off pin and is configured to control the reference signal generation capacitor to charge when the input voltage is higher than the over-voltage threshold and to control the reference signal generation capacitor to discharge when the input voltage is lower than the over-voltage threshold.

3. The soft-off control circuit of claim 1, comprising:
a comparison circuit having a first comparison input terminal, a second comparison input terminal and a comparison output terminal, wherein the first comparison input terminal is configured to receive the input voltage, the second comparison input terminal is configured to receive the over-voltage threshold, and the comparison circuit is configured to compare the input voltage with the over-voltage threshold so as to provide a comparison output signal at the comparison output terminal;
a first current source having a first terminal coupled to an internal supply voltage and a second terminal configured to provide a first current;
a first switch element having a first switch control terminal, a first switch terminal and a second switch terminal, wherein the first switch control terminal is configured to receive the comparison output signal, the first switch terminal is electrically coupled to the second terminal of the first current source to receive the first current, and the second switch terminal is electrically coupled to the output terminal of the soft-off control circuit;
a second current source having a first terminal configured to provide a second current and a second terminal coupled to ground; and
a second switch element having a second switch control terminal, a third switch terminal and a fourth switch terminal, wherein the second switch control terminal is configured to receive the comparison output signal, the third switch terminal is electrically coupled to the first terminal of the second current source to receive the second current, and the fourth switch terminal is electrically coupled to the output terminal of the soft-off control circuit; wherein
when the input voltage is lower than the over-voltage threshold, the comparison output signal has a first logic state and is configured to drive the first switch element to switch off and the second switch element to switch on so that the second current is provided as the soft-off control signal; and wherein
when the input voltage is higher than the over-voltage threshold, the comparison output signal has a second logic state and is configured to drive the first switch element to switch on and the second switch element to switch off so that the first current is provided as the soft-off control signal.

4. The soft-off control circuit of claim 3, further comprising:
an offset correction circuit configured to couple the input voltage to the first comparison input terminal of the comparison circuit, wherein the offset correction circuit at least comprises a correction switch element matching with the main switch, and wherein the correction switch element has a breakdown voltage functioning as the over-voltage threshold; and wherein
the second comparison input terminal of the comparison circuit is disconnected from the over-voltage threshold and is configured to receive a predetermined second over-voltage threshold, wherein the second over-voltage threshold is set to be equal to an instantaneous value of a voltage signal at the first comparison input terminal when the input voltage is just increased to be higher than the over-voltage threshold; and wherein
the comparison circuit is configured to compare the voltage signal at the first comparison input terminal with the second over-voltage threshold so as to provide the comparison output signal; and wherein
when the voltage signal at the first comparison input terminal is higher than the second over-voltage threshold, the comparison output signal has the second logic state; and wherein
when the voltage signal at the first comparison input terminal is lower than the second over-voltage threshold, the comparison output signal has the first logic state.

5. The soft-off control circuit of claim 4, wherein the offset correction circuit comprises:
a controllable current source having an enable input terminal configured to receive the enable signal, a first terminal configured to receive the internal supply voltage, a second terminal connected to ground and an output terminal, wherein the controllable current source is configured to output a reference current at the output terminal when the enable signal is at the first enable state, and is further configured to cut the reference current off from the output terminal when the enable signal is at the second enable state;
a current mirror having a mirror input terminal, a mirror output terminal and a current summing terminal, wherein the mirror input terminal is coupled to the output terminal of the controllable current source so as to receive the reference current when the enable signal is at the first enable state, and wherein the mirror output terminal is configured to mirror the reference current and apply a positive mirror factor to provide a mirrored current, and wherein the mirror output terminal is further configured to be coupled to the second input terminal of the soft-off control circuit to receive the input voltage, and wherein the current summing terminal is configured to provide a summing current which is a sum of the current flowing through the mirror input terminal and the current flowing through the mirror output terminal; and
a current to voltage conversion circuit coupled between the current summing terminal and ground, and configured to convert the summing current to a voltage signal with a predetermined conversion factor, wherein the current to voltage conversion circuit is further coupled to the comparison circuit to send the voltage signal to the first comparison input terminal of the comparison circuit.

6. The soft-off control circuit of claim 5, wherein the controllable current source comprises:
a reference current source configured to provide the reference current;
a third switch element having a third switch control terminal configured to receive the enable signal, a fifth switch terminal coupled to the reference current source to receive the reference current, and a sixth switch terminal coupled to the output terminal of the controllable current source;

a fourth switch element having a fourth switch control terminal configured to receive the enable signal, a seventh switch terminal coupled to the output terminal of the controllable current source, and an eighth switch terminal connected to the ground; wherein when the enable signal is at the first enable state, the third switch element is turned on and the fourth switch element is turned off, so that the reference current is transmitted to the output terminal of the controllable current source; and wherein when the enable signal is at the second enable state, the fourth switch element is turned off and the fourth switch element is turned on, so that the reference current is cut off from the output terminal of the controllable current source.

7. The soft-off control circuit of claim 5, wherein the current mirror comprises:
   a first high-voltage transistor matching with the main switch and having a drain, a gate, and a source; and
   a second transistor having a drain, a gate, and a source; wherein
   the drain and the gate of the first high-voltage transistor are coupled together to form the mirror input terminal; and wherein
   the drain of the second transistor is configured to function as the mirror output terminal; and wherein
   the gate of the second transistor is coupled to the gate of the first high-voltage transistor; and wherein
   the source of the first high-voltage transistor and the source of the second transistor are coupled together to form the current summing terminal; and wherein
   the first high-voltage transistor has a breakdown voltage which is configured to function as the over-voltage threshold.

8. The soft-off control circuit of claim 7, wherein
   the first high-voltage transistor has a first channel having a first channel width and a first channel length determining a first ratio of the first channel width to the first channel length; and wherein
   the second transistor has a second channel having a second channel width and a second channel length determining a second ratio of the second channel width to the second channel length; and wherein
   the mirror factor is set by adjusting a ratio of the second ratio to the first ratio.

9. The soft-off control circuit of claim 4, wherein the offset correction circuit comprises:
   a controllable current source having an enable input terminal configured to receive the enable signal, a first terminal configured to receive the input voltage, and an output terminal, wherein the controllable current source is configured to output a current at the output terminal when the enable signal is at the first enable state, and is further configured to cut the current off from the output terminal when the enable signal is at the second enable state; and
   a current to voltage conversion circuit coupled between the output terminal of the controllable current source and ground, and configured to convert the current at the output terminal of the controllable current source to a second voltage signal with a second predetermined conversion factor, wherein the current to voltage conversion circuit is further coupled to the comparison circuit to send the second voltage signal to the first comparison input terminal of the comparison circuit.

10. The soft-off control circuit of claim 8, wherein the controllable current source comprises:
    a third high-voltage transistor matching with the main switch and having a drain, a gate and a source, wherein the drain is configured to receive the input voltage, and wherein the gate is coupled to the source, and wherein the source is configured to provide the current; and
    a fifth switch element having a fifth switch control terminal, a ninth switch terminal and a tenth switch terminal, wherein the fifth switch control terminal is configured to receive the enable signal, the ninth switch terminal is coupled to the source of the third high-voltage transistor to receive the current, and the tenth switch terminal is coupled to the output terminal of the controllable current source; and wherein
    when the enable signal is at the first enable state, the fifth switch element is turned on so that the current is transmitted to the output terminal of the controllable current source; and wherein
    when the enable signal is at the second enable state, the fifth switch element is turned off so that the current is cut off from the output terminal of the controllable current source; and wherein
    the third high-voltage transistor has a breakdown voltage which is configured to function as the over-voltage threshold.

11. A variable reference signal generation module comprising the soft-off control circuit of claim 1, wherein the variable reference signal generation module is coupled to the soft-start/soft-off pin to provide the variable reference signal.

12. The variable reference signal generation module of claim 11, further comprising:
    a soft-start control circuit configured to receive the enable signal, wherein the soft-start control circuit is configured to be disabled when the enable signal is at the first enable state and to be enabled when the enable signal is at the second enable state, and wherein the soft-start control circuit is further configured to output a soft-start control signal when it is enabled, and wherein the soft-start control signal is configured to control the variable reference signal to increase gradually; and
    a selection circuit having a first transmission terminal, a second transmission terminal, a third transmission terminal and a transmission control terminal, wherein the first transmission terminal is coupled to the soft-start/soft-off pin, and wherein the second transmission terminal is coupled to the output terminal of the soft-off control circuit so as to receive the soft-off control signal, and wherein the third transmission terminal is coupled to the output terminal of the soft-start control circuit so as to receive the soft-start control signal, and wherein the transmission control terminal is configured to receive the enable signal, and wherein the selection circuit is configured to couple the first transmission terminal to the second transmission terminal when the enable signal is at the first enable state, and is further configured to couple the first transmission terminal to the third transmission terminal when the enable signal is at the second enable state.

13. A power converter having a normal operation and a soft-off procedure, the power converter comprising:
    an input port configured to receive an input voltage;
    an output port configured to provide an output voltage;

a switch module at least comprising a main switch configured to switch on and off based on a driving signal to convert the input voltage to the output voltage;

a control module having a first control input terminal, a second control input terminal, a third control input terminal and a control output terminal, wherein the first control input terminal is configured to receive a feedback signal indicative of the output voltage, and wherein the second control input terminal is configured to receive a constant reference signal indicative of a desired value of the output voltage, and wherein the third control input terminal is configured to receive a variable reference signal, and wherein the control module is configured to provide the driving signal at least based on processing the feedback signal and the constant reference signal during the normal operation, and wherein the control module is further configured to provide the driving signal at least based on processing the feedback signal and the variable reference signal during the soft-off procedure; and a variable reference signal generation module configured to provide a variable reference signal to the power converter; wherein the variable reference signal generation module comprises a soft-off control circuit configured to control the soft-off procedure of the power converter through controlling the variable reference signal; and wherein the soft-off control circuit has a first input terminal configured to receive the input voltage of the power converter, a second input terminal configured to receive an enable signal, a third input terminal configured to receive an over-voltage threshold and an output terminal configured to provide a soft-off control signal; wherein the enable signal has a first enable state for controlling the power converter to shut off and start the soft-off procedure and a second enable state for controlling the power converter to power on; and wherein the over-voltage threshold is designed to indicate an over-voltage of the input voltage during the soft-off procedure; and wherein the soft-off control circuit is configured to generate the soft-off control signal at least based on the enable signal, the input voltage and the over-voltage threshold, and wherein when the enable signal is at the first enable state, the soft-off control signal is configured to control the variable reference signal to increase when the input voltage is higher than the over-voltage threshold, and to control the variable reference signal to decrease when the input voltage is lower than the over-voltage threshold.

14. The power converter of claim 13 further having a soft-start procedure, wherein the variable reference signal generation module further comprises:

a soft-start control circuit configured to receive the enable signal, wherein the soft-start control circuit is configured to be disabled when the enable signal is at the first enable state and to be enabled when the enable signal is at the second enable state, and wherein the soft-start control circuit is further configured to output a soft-start control signal when it is enabled, and wherein the soft-start control signal is configured to control the soft-start procedure of the power converter through controlling the variable reference signal to increase gradually; and a selection circuit having a first transmission terminal, a second transmission terminal, a third transmission terminal and a transmission control terminal, wherein the first transmission terminal is coupled to the variable reference signal, and wherein the second transmission terminal is coupled to the output terminal of the soft-off control circuit so as to receive the soft-off control signal, and wherein the third transmission terminal is coupled to the output terminal of the soft-start control circuit so as to receive the soft-start control signal, and wherein the transmission control terminal is configured to receive the enable signal, and wherein the selection circuit is configured to couple the first transmission terminal to the second transmission terminal when the enable signal is at the first enable state, and is further configured to couple the first transmission terminal to the third transmission terminal when the enable signal is at the second enable state; and wherein the control module is further configured to provide the driving signal at least based on processing the feedback signal and the variable reference signal during the soft-start procedure.

15. A method for controlling a power converter, wherein the power converter comprises at least a main switch and is configured to convert an input voltage to an output voltage based on driving the main switch to switch on and off, and wherein the power converter has a soft-off procedure, the method for controlling the power converter comprising:

sensing the output voltage to provide a feedback signal indicative of the output voltage;

generating a variable reference signal;

sensing the input voltage during the soft-off procedure and comparing the input voltage with an over-voltage threshold to provide a soft-off control signal;

applying the soft-off control signal to control the variable reference signal to increase when the input voltage is higher than the over-voltage threshold;

applying the soft-off control signal to control the variable reference signal to decrease when the input voltage is lower than the over-voltage threshold during the soft-off procedure; and regulating the output voltage based on the variable reference signal and the feedback signal during the soft-off procedure, so as to control the output voltage to decrease with the decrease of the variable reference signal and increase with the increase of the variable reference signal.

16. The method of claim 15, wherein generating the variable reference signal comprises:

generating the variable reference signal through controlling the charging and discharging of a reference signal generation capacitor by the soft-off control signal; and wherein the soft-off control signal is applied to control the variable reference signal to increase through controlling the charging of the reference signal generation capacitor; and wherein the soft-off control signal is further applied to control the variable reference signal to decrease through controlling the discharging of the reference signal generation capacitor.

17. The method of claim 15, further comprising:

setting the over-voltage threshold to a break down voltage of a high-voltage transistor matching with the main switch.

18. The method of claim 15, wherein the power converter further has a soft-start procedure, and wherein the method further comprises:

providing a soft-start control signal during the soft-start procedure; and in response to the enable signal, selecting the soft-start control signal to control the variable reference signal during the soft-start procedure, and selecting the soft-off control signal to control the variable reference signal during the soft-off procedure; and regulating the output voltage based on the variable reference signal and the feedback signal during the soft-start procedure, so as to control the output voltage to decrease with the decrease of the variable reference signal and increase with the increase of the variable reference signal.

* * * * *